United States Patent
Xiong et al.

(10) Patent No.: US 9,800,013 B2
(45) Date of Patent: Oct. 24, 2017

(54) RAMAN PUMP LASER CONTROL APPARATUS AND CONTROL METHOD THEREFOR

(71) Applicants: Accelink Technologies Co., Ltd., Wuhan (CN); Accelink Electronic Technology Co., Ltd, Wuhan (CN)

(72) Inventors: Tao Xiong, Wuhan (CN); Chengpeng Fu, Wuhan (CN); Menghui Le, Wuhan (CN); Jintao Tao, Wuhan (CN); Yunyu Jing, Wuhan (CN); Qinlian Bu, Wuhan (CN); Chunping Yu, Wuhan (CN)

(73) Assignees: Accelink Technologies Co., Ltd. (CN); Accelink Electronic Technology Co., Ltd (CN)

(*) Notice: Subject to any disclaimer, the term of this patent is extended or adjusted under 35 U.S.C. 154(b) by 0 days.

(21) Appl. No.: 15/106,553

(22) PCT Filed: Dec. 25, 2013

(86) PCT No.: PCT/CN2013/090420
§ 371 (c)(1),
(2) Date: Oct. 11, 2016

(87) PCT Pub. No.: WO2015/089868
PCT Pub. Date: Jun. 25, 2015

(65) Prior Publication Data
US 2017/0025814 A1 Jan. 26, 2017

(30) Foreign Application Priority Data
Dec. 20, 2013 (CN) .......................... 2013 1 0705859

(51) Int. Cl.
*H01S 3/30* (2006.01)
*H01S 3/067* (2006.01)
(Continued)

(52) U.S. Cl.
CPC .......... *H01S 3/302* (2013.01); *H01S 3/06754* (2013.01); *H01S 3/094003* (2013.01);
(Continued)

(58) Field of Classification Search
CPC ...... H01S 3/302; H01S 3/2391; H01S 3/1305; H01S 3/06754; H01S 3/094003; H01S 3/094096; H04B 10/2916
See application file for complete search history.

(56) References Cited

U.S. PATENT DOCUMENTS

| | | | |
|---|---|---|---|
| 6,088,152 A * | 7/2000 | Berger | H01S 3/30 359/334 |
| 6,498,677 B1 | 12/2002 | Sun et al. | |

(Continued)

FOREIGN PATENT DOCUMENTS

| | | |
|---|---|---|
| CN | 1490660 A | 4/2004 |
| CN | 101789829 A | 7/2010 |

(Continued)

OTHER PUBLICATIONS

International Search Report for Application No. PCT/CN2013/090420 dated Sep. 29, 2014.

*Primary Examiner* — Dung Nguyen
(74) *Attorney, Agent, or Firm* — Lerner, David, Littenberg, Krumholz & Mentlik, LLP

(57) ABSTRACT

A Raman pump laser control apparatus comprises a wavelength division multiplexer, a tap coupler, a photoelectric detector, an analog amplification processing circuit, an analog-to-digital converter, a fast Raman pump control unit, an digital-analog converter, and a Raman pump laser. The fast Raman pump control unit, after having known anticipated output light power of the Raman pump laser, based on a direct relationship between a current anticipated output light power of the Raman pump laser and input digital quantity that is needed by the digital-analog converter, uses a feedforward control mechanism so that actual output light power of the Raman pump laser fastly approximates the anticipated (Continued)

output light power thereof, and then synchronously combines with a feedback control mechanism so that the actual output light power of the Raman pump laser is precisely locked on the anticipated output light power, thereby achieving fast and precise control of the Raman pump laser.

14 Claims, 4 Drawing Sheets

(51) Int. Cl.
  *H01S 3/094* (2006.01)
  *H01S 3/13* (2006.01)
  *H04B 10/291* (2013.01)
  *H01S 3/23* (2006.01)
(52) U.S. Cl.
  CPC ...... *H01S 3/094096* (2013.01); *H01S 3/1301* (2013.01); *H01S 3/1305* (2013.01); *H01S 3/2391* (2013.01); *H04B 10/2916* (2013.01)

(56) References Cited

U.S. PATENT DOCUMENTS

| | | | |
|---|---|---|---|
| 6,850,360 | B1 | 2/2005 | Chen et al. |
| 7,031,049 | B2 | 4/2006 | Kamada et al. |
| 7,916,384 | B2 | 3/2011 | Zhou et al. |
| 8,139,285 | B2 | 3/2012 | Onaka et al. |
| 8,797,640 | B2 | 8/2014 | Fu et al. |
| 9,281,654 | B2 * | 3/2016 | Akasaka ............ H01S 3/06754 |
| 2005/0122570 | A1 | 6/2005 | Chang et al. |
| 2007/0258132 | A1 | 11/2007 | Zhou et al. |

FOREIGN PATENT DOCUMENTS

| | | |
|---|---|---|
| CN | 102307068 A | 1/2012 |
| CN | 103138842 A | 6/2013 |

\* cited by examiner

Pump feedforward control-based on direct relation

| Expected output power of pump/mW | Pump DAC |
|---|---|
| mW1 | DAC value 1 |
| mW2 | DAC value 2 |
| . | . |
| . | . |
| . | . |
| mWn | DAC value n |

Fig.5

Pump feedforward control-based on Backlight current

| Expected output power of pump/mW | Backlight current of pump | Pump DAC |
|---|---|---|
| mW1 | backlight current 1 | DAC value 1 |
| mW2 | backlight current 2 | DAC value 2 |
| . | . | . |
| . | . | . |
| . | . | . |
| mWn | backlight current n | DAC value n |

Fig.6

Pump feedforward control-based on PD detection current

| Expected output power of pump/mW | PD detection current | Pump DAC |
|---|---|---|
| mW1 | detection current 1 | DAC value 1 |
| mW2 | detection current 2 | DAC value 2 |
| . | . | . |
| . | . | . |
| . | . | . |
| mWn | detection current n | DAC value n |

Fig.7

RAMAN PUMP LASER CONTROL APPARATUS AND CONTROL METHOD THEREFOR

CROSS REFERENCE TO RELATED APPLICATIONS

The present application is a national phase entry under 35 U.S.C. §371 of International Application No. PCT/CN2013/090420 filed Dec. 25, 2013, published in China, which claims priority from Chinese Patent Application No. 201310705859.8 filed Dec. 20, 2013, all of which are incorporated herein by reference.

TECHNICAL FIELD

Embodiments of the present invention relate to control of Raman Pump Laser which belongs to field of optical communication, more particularly, to a control device of Raman Pump Laser with quick power response and a control method thereof.

BACKGROUND

The booming network data flow and users' demand for high-speed network application are leading the optical communication networks towards the way of ultra-wideband networks. Due to such advantages like those features of arbitrary working wavelength, wideband gain, distributed amplification and the capability of using common optical fiber as gain medium of the Raman optic fiber amplifier, it has been widely used in modern communication network.

Various optical amplifier manufacturers have conducted extensive researches on relative techniques of the Raman optical fiber amplifier. U.S. Pat. No. 7,031,049 disclosed a Loss Point detection method of the Raman optic fiber amplifier; U.S. Pat. No. 7,916,384 disclosed a method that can realize closed-loop control of the Raman optical fiber amplifier based on PID. U.S. Pat. No. 8,139,285 disclosed a Raman optical fiber amplifier and its controlling method, characterize by real-time gain control of Raman optical fiber amplifier. The above stated patents have basically shown the technical development trend of the Raman optical fiber amplifier, that is: from simple Raman output safe power protection and simple power control at early stage to research on real-time gain control at present. The existing technological development trend shows that the control on the Raman optical fiber amplifier focuses more on real-time control on gain. However, with the development of optical communication technique, the traditional static optical network has gradually progressed into dynamic optical network. On one hand, the dynamic optical network will introduce more surge of light, light fluctuation and photovoltaic conversion noise into optical fiber amplifier; on the other hand, frequent up and down wave becomes the theme of dynamic optical network. These demands of new dynamic features of the optical fiber amplifier will surely require the optical fiber amplifier to have quick dynamic response feature. As a type of optical amplifier, the Raman optical fiber amplifier also needs to meet this new technical requirement, that is, to realize quick control on the Raman optical fiber amplifier. There is no disclosure of relative technique in prior art.

SUMMARY OF THE INVENTION

An object of embodiments of this invention is to provide a device and its controlling method that can quickly control the Raman optical fiber amplifier pump laser, which make the Raman optical fiber amplifier have fast response feature.

Technological problem that embodiments of this invention aims to solve is to provide a device and its controlling method that can quickly control the Raman optical fiber amplifier pump laser, and to improve the dynamic working performance of the Raman optical fiber amplifier. It will enable it to have fast response feature so as to meet relative technical requirements of dynamic optical network.

Objects of embodiments of the invention are realized as following.

Embodiments of the invention provided a control device of Raman pump laser, comprising a wavelength division multiplexer, a tap coupler, a photoelectric detector, an analog amplifier processing circuit, an analog-digital converter, a fast Raman pump control unit, a digital-analog converter, and a Raman pump laser, wherein the wavelength division multiplexer couples the pump light output from the tap coupler with signal light;

the tap coupler splits the pump light, one part of light energy of the split light is coupled into the wavelength division multiplexer, and another part enters into the photoelectric detector;

the photoelectric detector detects the split light output from the tap coupler;

the analog amplifier processing circuit performs amplification processing on the analog signal detected by the photoelectric detector;

the analog-digital converter converts the analog signal processed by the analog amplifier processing circuit into digital signal;

the fast Raman pump control unit performs data processing on digital signal from the analog-digital converter and produces digital control signal;

the digital-analog converter converts the digital control signal from processing of the fast Raman pump control unit into analog control signal;

under the control of the analog control signal output from the digital-analog converter, the Raman pump laser produces pump light, which enters into the tap coupler to be split.

Embodiments of the invention further provided a control device of Raman pump laser, comprising a wavelength division multiplexer, a first tap coupler, a second tap coupler, a wavelength division multiplexer set, a photoelectric detector set, an analog amplifier processing circuit set, an analog-digital converter set, a fast Raman pump control unit, a digital-analog converter set, a Raman pump laser set and a pump combining unit, wherein the wavelength division multiplexer couples the pump light output from the first tap coupler with signal light, the pump light is split by the first tap coupler, in which a portion of the light energy of split light is coupled into the wavelength division multiplexer, another portion of the light enters into the second tap coupler, the second tap coupler re-splits a part of the light output from the first tap coupler, and outputs the split light into each wavelength division multiplexer in the wavelength division multiplexer set, each wavelength division multiplexer in the wavelength division multiplexer set filters the split light output from the second tap coupler and outputs selected split light signal of different wavelengths to each photoelectric detector in the photoelectric detector set, each photoelectric detector in the photoelectric detector set detects the optical power of split light signals of the different wavelength respectively and outputs the detected analog signal to corresponding analog amplifier processing circuits in the analog amplifier processing circuit set, each analog amplifier processing circuit in the analog amplifier processing circuit set performs processing on the input analog signal and then outputs it to corresponding analog-digital converter in the analog-digital converter set, each analog-digital converter in the analog-digital converter set converts the analog signal after amplifier processing into digital signal and outputs the digital signal representing optical power of each wavelength to the fast Raman pump control unit.

the fast Raman pump control unit performs data processing on the input digital signal representing the optical power of each wavelength respectively, and generates the digital control signal of each wavelength for each Raman pump laser in the Raman pump laser set respectively, each wavelength digital control signal is converted into analog control signals for each wavelength by each analog-digital converter in the analog-digital converter set respectively, each Raman pump lasers in the Raman pump laser set generates pump light of each wavelength under the control of analog control signal for corresponding wavelength, the pump lights of each wavelength enter into the pump combining unit to be combined, the pump combining unit outputs the combined pump light of a plurality of wavelengths to the first tap coupler for splitting, wherein the pump combining unit is of one or more types of IPBCD, IPBC, WDM, and PBC.

In above solution, optical powers detected by each photoelectric detector in the photoelectric detector set are corresponding to the current actual output power of each Raman pump laser in the Raman pump laser set respectively.

In above solution, number of the wavelength division multiplexers in the wavelength division multiplexer set, number of photoelectric detectors in the photoelectric detector set, number of analog amplifier processing circuits in the analog amplifier processing circuit set, number of analog-digital converters in the analog-digital converter set, and number of digital-analog converters in the digital-analog converter set all correspond to number of the Raman pump lasers in the Raman pump laser set.

In above solution, each wavelength division multiplexer in the wavelength division multiplexer set, each photoelectric detector in the photoelectric detector set, each analog amplifier processing circuit in the analog amplifier processing circuit set, each analog-digital converter in the analog-digital converter set, each digital-analog converter in the digital-analog converter set are corresponding to each Raman pump laser in the Raman pump laser set respectively.

In above solution, number of Raman pump lasers in the Raman pump laser set is 2 or more.

In above solution, the fast Raman pump control unit comprises digital processing chips, which can adopt DSP, FPGA, or ASIC, the analog amplifier processing circuit comprises a transconductance circuit or logarithmic circuit, the photoelectric detector comprises a photoelectric detection diode or other means which can detect the intensity of split light signal.

Embodiments of the invention further provided a controlling method for Raman pump laser with fast power response, that uses the control device of Raman pump laser in any one of above solutions, wherein the method is comprising:

feedforward control step of according to the results of the test or calibration, establishing relationship between current actual output optical power of each Raman pump laser and input value input to corresponding digital-analog converter of the of each Raman pump laser, wherein when the fast Raman pump control unit get the current expected output power of the Raman pump laser, generating corresponding feedforward output value and outputting it to corresponding digital-analog converter, according to this relationship;

feedback control steps of when the photoelectric detector detected the current actual output optical power of corresponding Raman pump laser, after the fast Raman pump control unit obtains the actual output optical power of the Raman pump laser, associating it with former expected output optical power of the Raman pump laser, the actual output optical power of the Raman pump laser being precisely locked to an expected output optical power of the Raman pump laser using the feedback control mechanism.

In above solution, establishing the relationship between the current actual output optical power of the Raman pump laser and the input value input to the corresponding digital-analog converter of the Raman pump laser is comprising: establishing linear relationship by linear fitting method, or establishing one-to-one mapping relationship by look-up table manner.

In above solution, the feedback control steps adopt position-type or incremental-type PI or PID controller.

Embodiments of this invention have the following technical effects:

1. It has a simple structure and is easy to be realized;
2. It can complete fast respond design by algorithm, and does not need extra cost;
3. It uses a new feedforward plus feedback control method to control the Raman optical fiber amplifier pump laser. It is easy to be implanted into overall control mechanism of the Raman optical fiber amplifier and makes the Raman optical fiber amplifier have fast response feature.

BRIEF DESCRIPTION OF ACCOMPANYING FIGURES

FIG. 5 is a schematic tabular drawing of the feedforward control data of the Raman pump laser;

FIG. 6 is a schematic drawing of creating the feedforward control data of the Raman pump laser using backlight detection current of the Raman pump laser.

FIG. 7 is a schematic tabular drawing of creating the feedforward control data of the Raman pump laser using detection current of photoelectric detector of the Raman pump laser. wherein:

Figure 1:
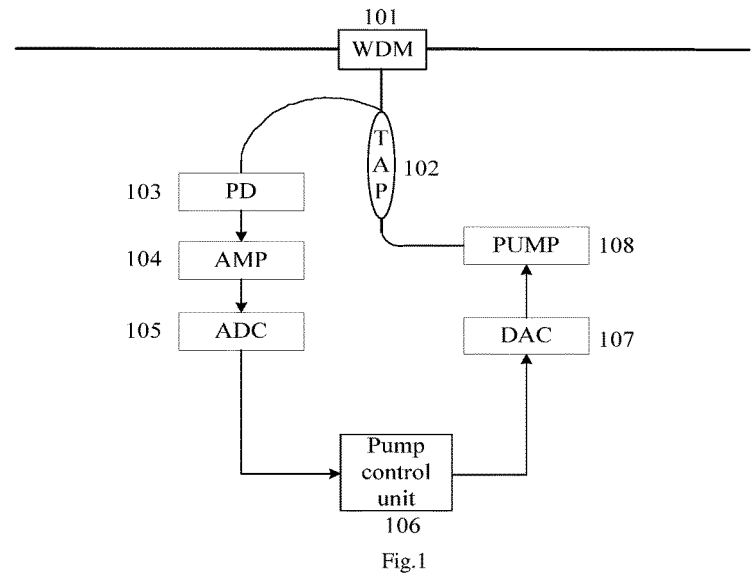
FIG. 1 is a structural diagram of device for fast control of Raman optical fiber amplifier pump laser.

101: wavelength division multiplexer
102: tap coupler
103: photoelectric detector
104: analog amplifier processing circuit
105: analog-digital converter
106: fast Raman pump control unit
107: digital-analog converter
108: Raman pump laser
201: the first wavelength division multiplexer
202: the first tap coupler 203: the second tap coupler
204: the second wavelength division multiplexer
205: the third wavelength division multiplexer
206, 207: the first photoelectric detector, the second photoelectric detector
208, 209: the first optical analog amplifier processing circuit, the second optical analog amplifier processing circuit
210, 211: the first, the second analog-digital converter
212: fast Raman pump control unit
213, 214: first, second digital-analog converter
215, 216: first, second Raman pump laser
217: pump combining unit
301: wavelength division multiplexer
302: first tap coupler
303: second tap coupler
304: wavelength division multiplexer set
305: photoelectric detector set
306: analog amplifier processing circuit set
307: analog-digital converter set
308: fast Raman pump control unit
309: digital-analog converter set
310: Raman pump laser set
311: pump combining unit

EMBODIMENTS

In order to let skilled in the art to better understand and implement embodiments of this invention, it is provided further detailed description thereof by using figures and specific implementation.

To solve the above technical problems, embodiments of this invention provides a control device of Raman pump laser that has fast power response and a control method of Raman pump laser that has fast power response based on above control device.

The control device of Raman pump laser provided by an embodiment of this invention is shown in FIG. 1, which is comprising: a wavelength division multiplexer 101 (WDM), a tap coupler 102 (TAP), a photoelectric detector 103 (PD), an analog amplifier processing circuit 104 (AMP), an analog-digital converter 105 (ADC), fast Raman pump control unit 106 (Pump Control Unit), digital-analog converter 107 (DAC), a Raman pump laser 108 (PUMP).

The wavelength division multiplexer 101 couples the pump light output from the tap coupler 102 with signal light; the tap coupler 102 splits the pump light, one part of light energy of the split light is coupled into the wavelength division multiplexer 101, and other part enters into the photoelectric detector 103, splitting ratio of which can be set to any suitable range as required; the photoelectric detector 103 detects the split light from the tap coupler 102. The analog amplifier processing circuit 104 amplifies the analog signal detected by the photoelectric detector 103; the analog-digital converter 105 converts the analog signal processed by the analog amplifier processing circuit 104 into digital signal; the fast Raman pump control unit 106 conducts data processing on digital signal from the analog-digital converter 105 and produces digital control signal; the digital-analog converter 107 converts the digital control signal from the fast Raman pump control unit 106 into analog control signal; under the control of the analog control signal output from the digital-analog converter 107, the Raman pump laser 108 produces pump light, which enters into the tap coupler 102 to be split.

The fast Raman pump control unit 106 uses digital processing chips, which can adopt DSP, FPGA, ASIC or other chips which have similar data processing function; the analog amplifier processing circuit 104 can be transconductance circuit or logarithmic circuit and so on; the photoelectric detector 103 can use photoelectric detection diode or other manner that can detect the intensity of split signal.

The working process of the control device of Raman pump laser shown in FIG. 1 are as follows: the pump light that is generated by the Raman pump laser 108 is split by the tap coupler 102, then a part of the split light is converted into analog current signal by the photoelectric detector 103 connected after the tap coupler 102. At that time, the analog current signal detected by the photoelectric detector 103 corresponds to current actual output power of the pump light of the Raman pump laser 108. The obtained analog current signal is amplified by the analog amplifier processing circuit 104, and is converted into voltage signal, then the analog-digital converter 105 converts the analog voltage signal into digital voltage amount, which illustrates the actual output power of the pump light of the Raman pump laser 108. The analog-digital converter 105 is connected with the fast Raman pump control unit 106, which processes the input digital voltage amount and generates digital control signal for controlling the power of the Raman pump laser 108, and outputs result to the digital-analog converter 107, which converts it into analog control signal for driving the Raman pump laser 108, which generates optical energy, which is split and coupled by the tap coupler 102 and then enter into the wavelength division multiplexer 101. Thus, it can realize the control function for the Raman optical fiber amplifier pump laser.

Figure 4:
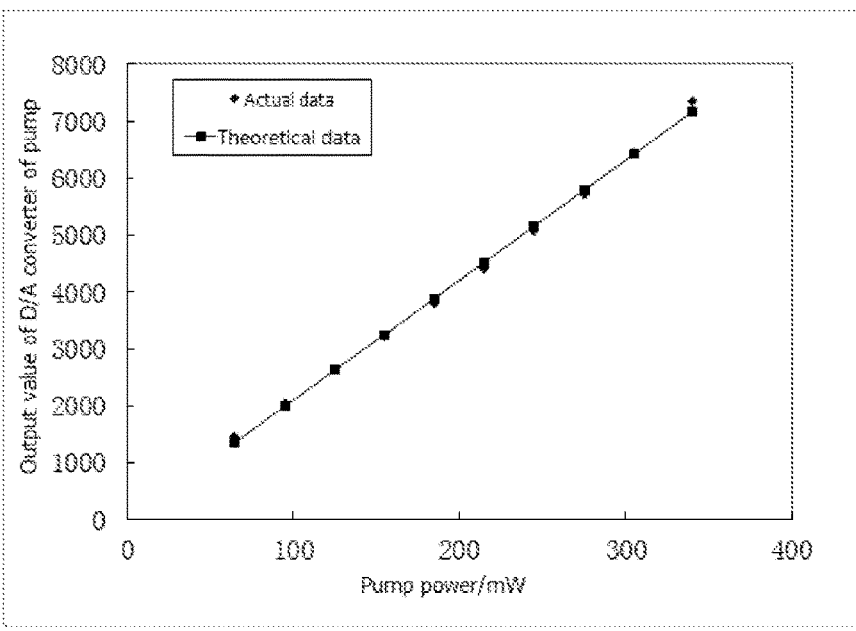
FIG. 4 is a schematic figure of linear curve fitting of feedforward control data of Raman pump laser.

The fast Raman pump control unit 106 generates the control signal of the optical power for the Raman pump laser 108 according to the detected actual output optical power of the Raman pump laser 108 and the expected output optical power of the Raman pump laser 108. The data processing procedure thereof includes: according to the result of the test or calibration, relationship between the current actual output optical power of the Raman pump laser 108 and the input value of the digital-analog converter 107 input into the Raman pump laser 108 is established. The first implementation can be shown in FIG. 4, in which it set up a kind of linear approximation relation, with the current actual output optical power of the Raman pump laser 108 represented as horizontal axis (the unit is mW) and the input value of the digital-analog converter 107 represented as longitudinal axis. Here, the input value of the digital-analog converter 107 is digital control signal value without dimension. By using the fitting formula or fitting straight-line, the fast Raman pump control unit 106 can directly get the digital control signal to be input into the digital-analog converter 107 according to the expected output optical power of the Raman pump laser 108. The second implementation can be shown in FIG. 5, which set up a kind of tabular relationship that is a one-to-one mapping relation between the expected actual output optical power of the Raman pump laser 108 and the input value of the digital-analog converter 107. The third implementation can be shown in FIG. 6. By establishing relationship between detected current from the backlight detector of the Raman pump laser 108 and the current actual output optical power of the Raman pump laser 108, and then making this relationship correspond to the input value of the digital-analog converter 107, a kind of feedforward relation can be established. The fourth implementation can be shown in FIG. 7. By using the tap coupler 102 connected to the output side of the Raman pump laser 108 and the corresponding photoelectric detector 103, it can set up correspondence relationship between the detected current of the photoelectric detector 103 and the current actual output optical power of the Raman pump laser 108, and then makes this relationship correspond to the input value of the digital-analog converter 107 so as to set up a kind of feedforward relation. The relationship of direct association between the output optical power of the Raman pump laser 108 and the input value of the digital-analog converter 107 for controlling the Raman pump laser 108 established by above four manners, may be referred to as a feedforward control mechanism of Raman pump laser. In actual implementation, when the fast Raman pump control unit 106 get the current expected output power of the Raman pump laser 108, it can generate a corresponding feedforward output value according to this feedforward control mechanism and output it into the digital-analog converter 107. Meanwhile, the photoelectric detector 103 detects the current actual output optical power of the Raman pump laser 108. The fast Raman pump control unit 106 obtains the current actual output optical power of the Raman pump laser 108, which then can be associated with the former expected output optical power of the Raman pump laser 108. Based on the feedback control mechanism, the actual output optical power of the Raman pump laser 108 can be precisely locked to an expected output optical power of the Raman pump laser 108.

Since the fast Raman pump control unit 106 get the expected output optical power of the Raman pump laser 108, based on the direct relationship between the current expected actual output optical power of the Raman pump laser 108 and required input digital quantity of the digital-analog converter 107 for controlling the Raman pump laser 108, the feedforward control mechanism can be used, such that the actual output optical power of the Raman pump laser 108 can approach to its expected output optical power quickly. With then combined with the feedback control mechanism synchronously, the actual output optical power of the Raman pump laser 108 can be precisely locked to its expected output optical power, so as to realize fast and precise control of the Raman pump laser 108.

The feedback control mechanism is realized based on the current expected actual output optical power and the measured current actual output optical power of the Raman pump laser 108. A preferred way is to use PID controller which can be PI or PID controller of position mode or incremental mode. As an alternative, gradual approximation manner may be adopted to lock the actual output power of the Raman pump laser precisely to its expected output power.

Figure 2:
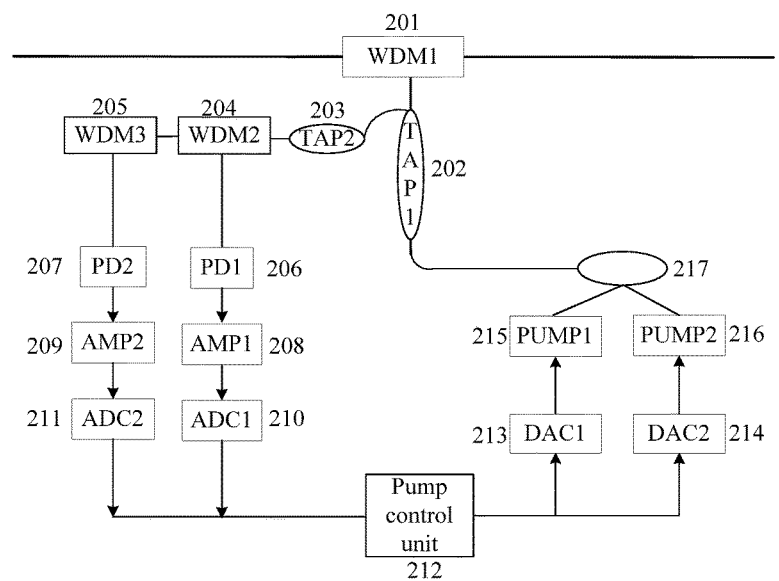
FIG. 2 is a structural schematic diagram of a second example of the device for fast control of Raman optical fiber amplifier pump laser.

The second implementation of the control device of the Raman pump laser according to embodiment of the invention is as shown in FIG. 2, which is expanded from the single Raman pump control device shown in FIG. 1, and can be used in Raman amplifier which contains two Raman pump lasers, comprising: the first wavelength division multiplexer 201 (WDM1), the first tap coupler 202 (TAP1), the second tap coupler 203 (TAP2), the second wavelength division multiplexer 204 (WDM2), the third wavelength division multiplexer 205 (WDM3), the first photoelectric detector 206 (PD1), the second photoelectric detector 207 (PD2), the first analog amplifier processing circuit 208 (AMP1), the second analog amplifier processing circuit 209 (AMP2), the first analog-digital converter 210 (ADC1), the second analog-digital converter 211 (ADC2), fast Raman pump control unit 212 (Pump Control Unit), the first digital-analog converter 213 (DAC1), the second digital-analog converter 214 (DAC2), the first Raman pump laser 215 (PUMP1), the second Raman pump laser 216 (PUMP2) and pump combining unit 217.

The first wavelength division multiplexer 201 couples the pump light output from the first tap coupler 202 with signal light; the pump light is split by the first tap coupler 202, in which a portion of the light energy of split light is coupled into the first wavelength division multiplexer 201, another portion of the light enters into the second tap coupler 203. Splitting ratio thereof can be set to any suitable range as required. the second tap coupler 203 re-splits a portion of the split light output from the first tap coupler 202, and outputs the split light to the second wavelength division multiplexer 204 and the third wavelength division multiplexer 205. Splitting ratio thereof tap coupler can be set to any suitable range as required.

The second wavelength division multiplexer 204 filters the split light output from the second tap coupler 203, and selected splitting signal of the first wavelength is output to the first photoelectric detector 206; the first photoelectric detector 206 detects the input optical power and outputs the detected analog signal to the first analog amplifier processing circuit 208; the first analog amplifier processing circuit 208 amplifies the input analog signal and outputs it to the first analog-digital converter 210; the first analog-digital converter 210 converts the input analog signal after amplified into digital signal, and outputs the digital signal representing optical power of the first wavelength to the fast Raman pump control unit 212.

The third wavelength division multiplexer 205 filters the splitting light output from the second tap coupler 203, and selected splitting light signal with second wavelength is output to the second photoelectric detector 207; the second photoelectric detector 207 detects the input optical power, and outputs the detected analog signal to the second analog amplifier processing circuit 209; the second analog amplifier processing circuit 209 amplifies the input analog signal and outputs it into the second analog-digital converter 211; the second analog-digital converter 211 converts the analog signal after amplified into the digital signal, and outputs the digital signal representing optical power of the second wavelength to the fast Raman pump control unit 212.

The fast Raman pump control unit 212 conducts data processing on input digital signals that represent optical power of the first and the second wavelength respectively, and generates the first wavelength digital control signal and the second wavelength digital control signal respectively for the first Raman pump laser 215 and the second Raman pump laser 216. The first wavelength digital control signal generated for the first Raman pump laser 215 is converted into the first wavelength analog control signal by the first digital-analog converter 213. The first Raman pump laser 215 generates pump light of the first wavelength under the control of the first wavelength analog control signal output from the first digital-analog converter 213. The generated pump light of the first wavelength enters into the pump combining unit 217 to be combined. The second wavelength digital control signal generated for the second Raman pump laser 216 is converted into the second wavelength analog control signal by the second digital-analog converter 214. The second Raman pump laser 216 generates pump light of the second wavelength under the control of the second wavelength analog control signal output from the second digital-analog converter 214. The generated pump light of the second wavelength enters into the pump combining unit 217 to be combined. The pump combining unit 217 outputs combined pump lights of a plurality of wavelengths to the first tap coupler 202 to be split.

The optical powers detected by first photoelectric detector and the second photoelectric detector are corresponding to the current actual output power of the first Raman pump laser and the second Raman pump laser respectively.

Figure 3:
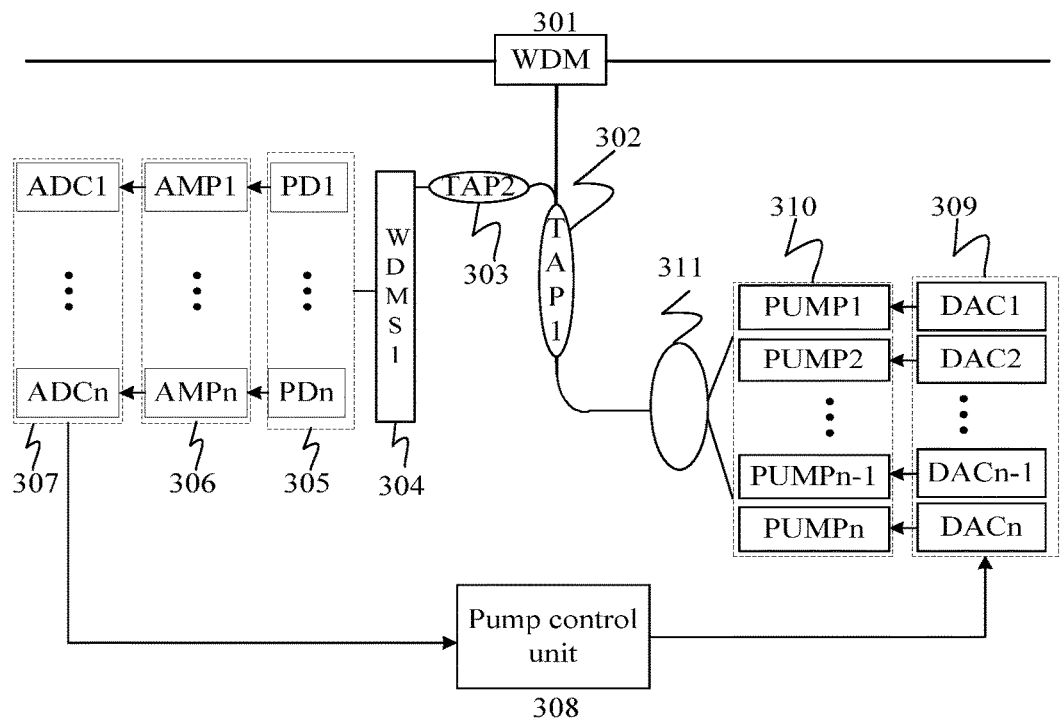
FIG. 3 is a structure schematic diagram of the third example of device for the fast control of Raman optical fiber amplifier pump laser.

The third implementation of the control device of the Raman pump laser according to embodiment of the invention is as shown in FIG. 3, which can be expanded from the double Raman pump control devices shown in FIG. 2, and can be used in Raman amplifier which contains a plurality of Raman pump lasers, comprising: wavelength division multiplexer 301 (WDM), the first tap coupler 302 (TAP1), the second tap coupler 303 (TAP2), the wavelength division multiplexer set 304 (WDMS1), the photoelectric detector set 305 (PD1, . . . ,PDn), the analog amplifier processing circuit set 306 (AMP1, . . . ,AMPn), analog-digital converter set 307 (ADC1, . . . ,ADCn), fast Raman pump control unit 308 (Pump Control Unit), digital-analog converter set 309 (DAC1, . . . ,DACn), Raman pump laser set 310 (PUMP1, . . . ,PUMPn) and pump combining unit 311.

The wavelength division multiplexer 301 couples the pump light output from the first tap coupler 302 with signal light; the pump light is split by the first tap coupler 302, in which a portion of the light energy of split light is coupled into the wavelength division multiplexer 301, another portion of the light enters into the second tap coupler 303. Splitting ratio thereof can be set to any suitable range as required. The second tap coupler 303 re-splits a part of the light output from the first tap coupler 302, and outputs the split light into each wavelength division multiplexer in the wavelength division multiplexer set 304, the splitting ratio of which can be set to any suitable range as required. Each wavelength division multiplexer in the wavelength division multiplexer set 304 filters the split light output from the second tap coupler 303 and outputs selected split light signal of the first to the nth wavelengths into the first to the nth photoelectric detectors in the photoelectric detector set 305; the first to the nth photoelectric detectors in the photoelectric detector set 305 detects the optical power of split light signals of the first to the nth wavelength respectively and outputs the detected analog signal to the first to the nth analog amplifier processing circuits in the analog amplifier processing circuit set 306. The first to the nth analog amplifier processing circuit in the analog amplifier processing circuit set 306 amplifies the input analog signal and then outputs it into the first to the nth analog-digital converter in the analog-digital converter set 307; the first to the nth analog-digital converter in the analog-digital converter set 307 converts the analog signal after amplified into digital signal and outputs the digital signal representing the first to the nth wavelength optical power to fast Raman pump control unit 308. The fast Raman pump control unit 308 conducts data processing on the input digital signal representing the optical power of the first to the nth wavelengths respectively, and generates the digital control signal of first to the nth wavelengths for the first to the nth Raman pump lasers in the Raman pump laser set 310 respectively; the first to the nth wavelength digital control signal are converted into the first to the nth wavelength analog control signals by the first to the nth analog-digital converter in the analog-digital converter set 309 respectively. The first to the nth Raman pump lasers in the Raman pump laser set 310 generates pump light of the first to the nth wavelengths under the control of the first to the nth wavelength analog control signal output from the first to the nth analog-digital converters in the analog-digital converter set 309, the generated pump lights of first to the nth wavelengths are combined in the pump combining unit 311; the pump combining unit 311 outputs the combined pump light of a plurality of wavelengths to the first tap coupler 302 for splitting.

In the fast Raman pump control unit 308, data processing procedure comprises: firstly, according to result of test or calibration, relationship between the current actual output optical power of the Raman pump laser and the set value of the pump laser DAC being established. The first implementation shown in FIG. 4 established a kind of linear approximation relation with the current actual output optical power of the Raman pump laser on each channel or each wavelength represented as horizontal axis (the unit is mW) and the input value of digital-analog converter on each channel or each wavelength represented as vertical axis. By using the fitting formula or fitting straight-line, the fast Raman pump control unit 308 can get the digital control signal to be input to corresponding digital-analog converter according to the expected output optical power of Raman pump laser. The second implementation shown in FIG. 5 established a kind of tabular relationship, in which a one-to-one mapping relation between the expected output optical power of the Raman pump laser on each channel or each wavelength and the input value of corresponding digital-analog converter is established. The third implementation shown in FIG. 6 established relationship between the detected current from backlight detector of the Raman pump laser and the current actual output optical power of the Raman pump laser, and then made this relationship correspond to the input value of the digital-analog converter, so as to set up a kind of feedforward relation. According to the fourth implementation shown in FIG. 7, by using the tap coupler connected to the output side of the Raman pump laser and the corresponding photoelectric detector, it can set up correspondence relationship between the detected current of the photoelectric detector and the current actual output optical power of the Raman pump laser, and then makes this relationship correspond to the input value of the digital-analog converter so as to set up a kind of feedforward relation. The relationship of direct association between the output optical power of the Raman pump laser on each channel/each wavelength and the input value of the digital-analog converter for controlling the Raman pump laser established by above four manners, may be referred to as a feedforward control mechanism of Raman pump laser. In actual implementation, when the fast Raman pump control unit get the current expected output power of the Raman pump laser on each channel/each wavelength or on any channel/any wavelength, it can generate a corresponding feedforward output value according to this feedforward control mechanism and output it into corresponding digital-analog converter. Meanwhile, the photoelectric detector on each channel/each wavelength or on any channel/any wavelength detects the current actual output optical power of the Raman pump laser. The fast Raman pump control unit 308 obtains the current actual output optical power of the Raman pump laser, which then can be associated with the former expected output optical power of the Raman pump laser. Based on the feedback control mechanism, the actual output optical power of the Raman pump laser can be precisely locked to an expected output optical power of the Raman pump laser.

The optical powers detected by the first to the nth photoelectric detectors in the photoelectric detector set correspond to the current actual output powers of the first to the nth Raman pump lasers in the Raman pump laser set respectively. Likewise, the number of the wavelength division multiplexers in the wavelength division multiplexer set 304, the number of photoelectric detectors in the photoelectric detector set 305, the number of analog amplifier processing circuits in the analog amplifier processing circuit set 306, the number of analog-digital converters in the analog-digital converter set 307, the number of digital-analog converters in the digital-analog converter set 309 all correspond to the number of the Raman pump lasers in the Raman pump laser set 310, whose number can be 2, 4, 8, 16, 32, 64, 128, 256, 512, 1024 or any other natural number, which is equivalent to the parallel connection of multiple first implementation shown in FIG. 1 with using just one fast Raman pump control unit to realize the quick control of the optical signal power on multiple channels and wavelengths. The Raman pump control unit controls on each channel and each wavelength respectively.

The means used in the second and the third implementations shown in FIGS. 2-3 can be same as those used in the first implementation shown in FIG. 1. The control manner that the fast Raman pump control unit adopts on the power of pump light on each channel or each wavelength is the same as the manner adopted in the first implementation shown in FIG. 1. Therefore, the control method that is suitable to single Raman pump control device shown in FIG. 1 can be applied to multiple Raman pump control devices, wherein the pump combining unit can use such devices like IPBCD, IPBC, WDM, PBC.

Mentioned above are only a few embodiment examples of the invention. Though specific and detailed in description, they should not thereby be understood as limitations to the application scope of this invention. What should be noted is that, possible variations and modifications developed by ordinary technicians in this field, without departing from the inventive concept of this invention, are all covered in the protection scope of this invention. Thus the protection scope of this invention should be subject to the appended Claims.

The invention claimed is:

1. A control device of Raman pump laser, comprising a wavelength division multiplexer, a tap coupler, a photoelectric detector, an analog amplifier processing circuit, an analog-digital converter, a fast Raman pump control unit, a digital-analog converter, and a Raman pump laser,
wherein the wavelength division multiplexer couples the pump light output from the tap coupler with signal light;
the tap coupler splits the pump light, one part of light energy of the split light is coupled into the wavelength division multiplexer, and another part enters into the photoelectric detector,
the photoelectric detector detects the split light output from the tap coupler,
the analog amplifier processing circuit performs amplification processing on the analog signal detected by the photoelectric detector,
the analog-digital converter converts the analog signal processed by the analog amplifier processing circuit into digital signal,
the fast Raman pump control unit performs data processing on digital signal from the analog-digital converter and produces digital control signal,
the digital-analog converter converts the digital control signal from processing of the fast Raman pump control unit into analog control signal,
under the control of the analog control signal output from the digital-analog converter, the Raman pump laser produces pump light, which enters into the tap coupler to be split.

2. The control device of Raman pump laser of claim 1, wherein the fast Raman pump control unit comprises digital processing chips, which can adopt DSP, FPGA, or ASIC, the analog amplifier processing circuit comprises a transconductance circuit or logarithmic circuit, the photoelectric detector comprises a photoelectric detection diode or other means which can detect the intensity of split light signal.

3. A controlling method for Raman pump laser with fast power response, that uses the control device of Raman pump laser in claim 1, wherein the method is comprising:
feedforward control step of according to the results of the test or calibration, establishing relationship between current actual output optical power of each Raman pump laser and input value input to corresponding digital-analog converter of the of each Raman pump laser, wherein when the fast Raman pump control unit get the current expected output power of the Raman pump laser, generating corresponding feedforward output value and outputting it to corresponding digital-analog converter, according to this relationship;
feedback control steps of when the photoelectric detector detected the current actual output optical power of corresponding Raman pump laser, after the fast Raman pump control unit obtains the actual output optical power of the Raman pump laser, associating it with former expected output optical power of the Raman pump laser, the actual output optical power of the Raman pump laser being precisely locked to an expected output optical power of the Raman pump laser using the feedback control mechanism.

4. The control method for the Raman pump laser of claim 3, wherein establishing the relationship between the current actual output optical power of the Raman pump laser and the input value input to the corresponding digital-analog converter of the Raman pump laser is comprising: establishing linear relationship by linear fitting method, or establishing one-to-one mapping relationship by look-up table manner.

5. The control method for the Raman pump laser of claim 3, wherein the feedback control steps adopt position-type or incremental-type PI or PID controller.

6. A control device of Raman pump laser, comprising a wavelength division multiplexer, a first tap coupler, a second tap coupler, a wavelength division multiplexer set, a photoelectric detector set, an analog amplifier processing circuit set, an analog-digital converter set, a fast Raman pump control unit, a digital-analog converter set, a Raman pump laser set and a pump combining unit,
wherein the wavelength division multiplexer couples the pump light output from the first tap coupler with signal light,
the pump light is split by the first tap coupler, in which a portion of the light energy of split light is coupled into the wavelength division multiplexer, another portion of the light enters into the second tap coupler,
the second tap coupler re-splits a part of the light output from the first tap coupler, and outputs the split light into each wavelength division multiplexer in the wavelength division multiplexer set,
each wavelength division multiplexer in the wavelength division multiplexer set filters the split light output from the second tap coupler and outputs selected split light signal of different wavelengths to each photoelectric detector in the photoelectric detector set,
each photoelectric detector in the photoelectric detector set detects the optical power of split light signals of the different wavelength respectively and outputs the detected analog signal to corresponding analog amplifier processing circuits in the analog amplifier processing circuit set, each analog amplifier processing circuit in the analog amplifier processing circuit set performs processing on the input analog signal and then outputs it to corresponding analog-digital converter in the analog-digital converter set, each analog-digital converter in the analog-digital converter set converts the analog signal after amplifier processing into digital signal and outputs the digital signal representing optical power of each wavelength to the fast Raman pump control unit, the fast Raman pump control unit performs data processing on the input digital signal representing the optical power of each wavelength respectively, and generates the digital control signal of each wavelength for each Raman pump laser in the Raman pump laser set respectively, each wavelength digital control signal is converted into analog control signals for each wavelength by each analog-digital converter in the analog-digital converter set respectively, each Raman pump lasers in the Raman pump laser set generates pump light of each wavelength under the control of analog control signal for corresponding wavelength, the pump lights of each wavelength enter into the pump combining unit to be combined, the pump combining unit outputs the combined pump light of a plurality of wavelengths to the first tap coupler for splitting, wherein the pump combining unit is of one or more types of IPBCD, IPBC, WDM, and PBC.

7. A controlling method for Raman pump laser with fast power response, that uses the control device of Raman pump laser in claim 6, wherein the method is comprising:

feedforward control step of according to the results of the test or calibration, establishing relationship between current actual output optical power of each Raman pump laser and input value input to corresponding digital-analog converter of the of each Raman pump laser, wherein when the fast Raman pump control unit get the current expected output power of the Raman pump laser, generating corresponding feedforward output value and outputting it to corresponding digital-analog converter, according to this relationship;

feedback control steps of when the photoelectric detector detected the current actual output optical power of corresponding Raman pump laser, after the fast Raman pump control unit obtains the actual output optical power of the Raman pump laser, associating it with former expected output optical power of the Raman pump laser, the actual output optical power of the Raman pump laser being precisely locked to an expected output optical power of the Raman pump laser using the feedback control mechanism.

8. The control method for the Raman pump laser of claim 5, wherein establishing the relationship between the current actual output optical power of the Raman pump laser and the input value input to the corresponding digital-analog converter of the Raman pump laser is comprising: establishing linear relationship by linear fitting method, or establishing one-to-one mapping relationship by look-up table manner.

9. The control method for the Raman pump laser of claim 5, wherein the feedback control steps adopt position-type or incremental-type PI or PID controller.

10. The control device of Raman pump laser of claim 6, wherein the fast Raman pump control unit comprises digital processing chips, which can adopt DSP, FPGA, or ASIC, the analog amplifier processing circuit comprises a transconductance circuit or logarithmic circuit, the photoelectric detector comprises a photoelectric detection diode or other means which can detect the intensity of split light signal.

11. The control device of Raman pump laser of claim 6, wherein optical powers detected by each photoelectric detector in the photoelectric detector set are corresponding to the current actual output power of each Raman pump laser in the Raman pump laser set respectively.

12. The control device of Raman pump laser of claim 11, wherein number of the wavelength division multiplexers in the wavelength division multiplexer set, number of photoelectric detectors in the photoelectric detector set, number of analog amplifier processing circuits in the analog amplifier processing circuit set, number of analog-digital converters in the analog-digital converter set, and number of digital-analog converters in the digital-analog converter set all correspond to number of the Raman pump lasers in the Raman pump laser set.

13. The control device of Raman pump laser of claim 12, wherein each wavelength division multiplexer in the wavelength division multiplexer set, each photoelectric detector in the photoelectric detector set, each analog amplifier processing circuit in the analog amplifier processing circuit set, each analog-digital converter in the analog-digital converter set, each digital-analog converter in the digital-analog converter set are corresponding to each Raman pump laser in the Raman pump laser set respectively.

14. The control device of Raman pump laser of claim 13, wherein number of Raman pump lasers in the Raman pump laser set is 2 or more.

* * * * *